(12) United States Patent
Kise et al.

(10) Patent No.: US 6,696,203 B2
(45) Date of Patent: Feb. 24, 2004

(54) BATTERY AND ELECTRODE INCLUDING AN ACTIVE MATERIAL, AN ELECTRICALLY CONDUCTIVE MATERIAL AND A CONDUCTING AGENT

(75) Inventors: Makiko Kise, Tokyo (JP); Syoji Yoshioka, Tokyo (JP); Hironori Kuriki, Tokyo (JP); Hiroaki Urushibata, Tokyo (JP); Hisashi Shiota, Tokyo (JP); Jun Aragane, Tokyo (JP); Takashi Nishimura, Tokyo (JP); Shigeru Aihara, Tokyo (JP); Daigo Takemura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 343 days.

(21) Appl. No.: 09/779,583

(22) Filed: Feb. 9, 2001

(65) Prior Publication Data

US 2001/0036575 A1 Nov. 1, 2001

Related U.S. Application Data

(63) Continuation of application No. PCT/JP99/03091, filed on Jun. 10, 1999.

(51) Int. Cl.$^7$ .............................. H01M 4/04; H01M 4/62
(52) U.S. Cl. ........................................ 429/232; 429/217
(58) Field of Search .............................. 429/217, 218.1, 429/62, 232–233

(56) References Cited

U.S. PATENT DOCUMENTS 5,569,564 A * 10/1996 Swierbut .................... 429/224
5,599,644 A * 2/1997 Swierbut .................... 429/224
5,665,212 A * 9/1997 Zhong ........................ 304/297
5,807,645 A * 9/1998 Takeuchi .................... 429/218
6,153,332 A * 11/2000 Nishida ...................... 429/217
6,346,345 B2 * 2/2002 Shiota .......................... 429/62
6,399,252 B1 * 6/2002 Kise .......................... 429/232
6,440,605 B1 * 8/2002 Kise .......................... 429/217
6,440,608 B1 * 8/2002 Yoshioka .................... 429/233
2003/0129478 A1 * 7/2003 Nishimura .................... 429/62

FOREIGN PATENT DOCUMENTS

| EP | 851517 | * 7/1998 | ............ H01M/4/62 |
| EP | 1 128 451 | * 6/1999 | ............ H01M/4/04 |
| JP | 8-306354 | 11/1996 | |
| JP | 10-241665 | 9/1998 | |
| WO | Wo 9940640 | * 8/1999 | ............ H01M/4/62 |
| WO | WO 00/77867 A1 | 12/2000 | |

* cited by examiner

Primary Examiner—Mark Ruthkosky
(74) Attorney, Agent, or Firm—Oblon, Spivak, McClelland, Maier & Neustadt, P.C.

(57) ABSTRACT

The battery of the present invention comprises the electrode which contains the pre-determined amount of electronically conductive material at which resistance increases in accordance with temperature rise and conductive agent; the electrode wherein the ratio of the total amount of the electronically conductive material and the conductive agent to the active material is set to a pre-determined value; and the electrode wherein the average particle size of the conductive agent based on the average particle size of the electronically conductive material is in a pre-determined range. The coducitive material contains an electrically conductive filler and a crystalline resin. The conductive material and the coductive agent are contacted with the active material. A significant reduction in short circuit current is achieved over a defined range of conductive agent particle size.

23 Claims, 11 Drawing Sheets

(PARTICLE SIZE OF CONDUCTIVE AGENT)
/(PARTICLE SIZE OF ELECTRONICALLY
CONDUCTIVE MATERIAL)

BATTERY AND ELECTRODE INCLUDING AN ACTIVE MATERIAL, AN ELECTRICALLY CONDUCTIVE MATERIAL AND A CONDUCTING AGENT

This is a continuation of Application No. PCT/JP99/03091, filed Jun. 10, 1999.

BACKGROUND OF THE INVENTION

1. Field of the Invention

The present invention relates to a battery and a method for preparing the same. More particularly, the present invention relates to a battery obtained by using an electrode whose resistance becomes larger in accordance with temperature increase.

2. Description of the Background

Recently, with development in electronic appliances, high leveling of capacity and output density of a battery used as a power source is being advanced. As a battery, which can satisfy these requirements, attention is paid to a lithium ion secondary battery. The lithium ion secondary battery has an advantageous effect that energy density is high, while a sufficient counterplan for safety is required because a non-aqueous electrolytic solution is used.

As a counterplan for safety it has been conventionally suggested to incorporate a safety valve which releases increased internal pressure, or a PTC device of which resistance increases in accordance with the heat generated from external short circuit to break an electric current.

For example, as disclosed in Japanese Unexamined Patent Publication No. 328278/1992, there is known a method for attaching a safety valve and a PTC device to the positive electrode cap of a cylindrical battery. However, when the safety valve is operated, water in air may invade into the battery to react with lithium in the negative electrode and there is a fear of an exothermic reaction.

On the other hand, the PTC device successively breaks external short-circuit without causing any troubles. As a safety component running firstly at the emergency of the battery, the PTC device can be designed to run when the battery reaches at least 90° C. due to external short circuit.

Since the conventional lithium secondary battery has the structure mentioned above, there exist the following problems.

At occurrence of short-circuit and temperature rise inside the lithium secondary battery, increase of the short-circuit current can not be controlled in a conventional lithium secondary battery.

When the short-circuit inside the lithium secondary battery increases a temperature, a polyethylene or polypropylene separator interposed between the positive electrode and the negative electrode is expected to have a function that the separator softens or melts to close holes thereon and release or seal a non-aqueous electrolyte contained in the separator to decrease its ion conductivity, and thereby reducing the short-circuit current.

But a separator away from the heating part does not always melt. Also, when a temperature further rises, the separator melts and is fluidized, and thereby the function to electrically insulate the positive electrode and the negative electrode is lost to cause short-circuit.

Besides, particularly in a lithium ion secondary battery, a negative electrode is formed by applying a slurry comprising a negative electrode active material such as graphite, a binder such as PVDF (poly(vinylidene fluoride)) and a solvent, onto a substrate such as a copper foil which formus a collector, and drying it to form a thin film thereof. A positive electrode is also formed as a thin film in the same manner onto a substrate such as an aluminum foil, which forms a current collector. The positive electrode contains a positive electrode active material such as $LiCoO_2$, a binder and a conductive agent.

The conductive agent is used to increase an electronic conductivity at a positive electrode when the positive electrode active material has insufficient electronic conductivity. As the conductive agent, there is used carbon black (such as acetylene black) or graphite (such as artificial graphite KS-6 available form LONZA Co., Ltd.).

These positive and negative electrodes have a problem that when a temperature of the battery increases to at least 100° C. due to internal short-circuit or the like, large short-circuit current is generated and the temperature of the battery further increases due to the generation of heat, leading to a further increase of short-circuit current.

SUMMARY OF THE INVENTION

The present invention has been carried out in order to solve the above problems. The object of the present invention, in which an electrode is used of which resistance is increased when the temperature of the battery increases, is to provide a highly safe battery having excellent properties which is capable of controlling increase of short-circuit current even at temperature rise due to generation of heat.

The first battery of the present invention comprises an electrode containing an active material, and an electronically conductive material and a conductive agent contacted to the active material. The above electronically conductive material contains electrically conductive filler and a crystalline resin. The total amount of the above electronically conductive material and the conductive agent is 1 to 20 parts by weight based on 100 parts by weight of the above active material. According to this, the above electronically conductive material contains the electrically conductive filler and the crystalline resin to increase resistance thereof with temperature rise, and thus increase of current at electrode can be controlled with temperature rise. Furthermore, since the amount of the conductive agent was set to 1 to 20 parts by weight based on 100 arts by weight of the electronically conductive material, resistance at the electrode can be lowered to improve battery characteristics, and short-circuit current can be controlled to a low value.

The second battery of the present invention is that 0.5 to 30 parts by weight of the conductive agent is contained based on 100 parts by weight of the electronically conductive material. According to this, the electrode has low resistance before increase of changing ratio of resistance, since contains 1 to 30 parts by weight of the electronically conductive material based on 100 parts by weight of the active material.

The third battery of the present invention is that the average particle size of the conductive agent is $1/1000$ to $1/10$ based on the average particle size of the electronically conductive material. According to this, since the average particle size of the conductive agent is $1/1000$ to $1/10$ compared to that of the electronically conductive material in the seventh battery, current inside electrode is efficiently collected to improve battery characteristics.

The fourth battery of the present invention comprises an electrode having an active material layer containing an active material, and an electronically conductive material and a conductive agent contacted to the active material, wherein the above electronically conductive material contains an electrically conductive filler and a crystalline resin and wherein the active material layer comprises two layers which has high ratio of the electronically conductive material and which has low ratio thereof. According to this, electrodes having the active material layer comprising two layers one of which has high ratio of the electronically conductive material and the other of which has low ratio of the electronically conductive material can make a battery to have very low short-circuit current, high discharging capacitance and excellent battery properties such as cycle life.

The fifth battery of the present invention is that a melting point of the crystalline resin in the electronically conductive material is in a range of 90° C. to 160° C. According to this, since the electronically conductive material contains the crystalline resin having a melting point in the range of 90° C. to 160° C. to increase in changing ratio of resistance at about 90° C. to 160° C., characteristics of the battery and safety can be coexistent with each other.

The sixth battery of the present invention is that an amount of the electrically conductive filler is 40 to 70 parts by weight in the electronically conductive material. According to this, by setting the amount of the electrically conductive filler to 40 to 70 parts by weight in the electronically conductive material, changing ratio of resistance of the electrode can be large at a pre-determined temperature and discharging capacitance of the battery can be increased when the electrode is applied to the battery.

The seventh battery of the present invention is that a carbon material or an electrically conductive non-oxide is used as the electrically conductive filler. According to this, since the carbon material or the electrically conductive non-oxide is used as the electrically conductive filler, the electric conductivity of the electrode can be improved.

DETAILED DESCRIPTION OF THE PREFERRED EMBODIMENTS

Figure 1:
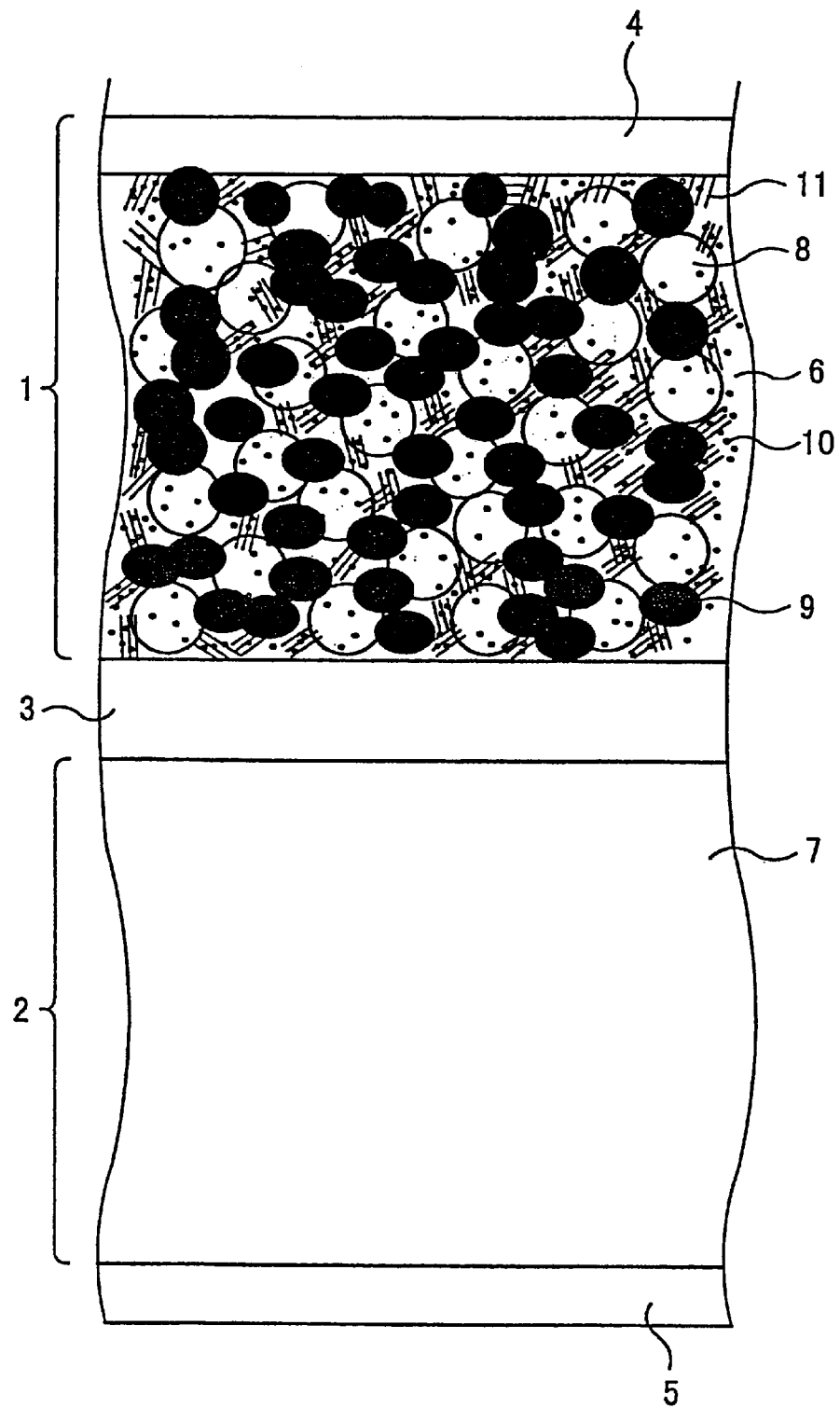
FIG. 1 shows structure of the battery of the present invention.

FIG. 1 is a view illustrating a battery of the present invention, in particular, a longitudinal sectional view of the battery. In the figure, numeral 1 indicates a positive electrode, numeral 2 indicates a negative electrode and numeral 3 indicates an electrolytic layer such as a separator which is provided between the positive electrode 1 and the negative electrode 2. The positive electrode 1 is obtained by forming a positive electrode active material layer 6 on a surface of a positive electrode current collector 4 comprising, for example, a metal film of aluminum. The negative electrode 2 comprises a negative electrode active material layer 7 obtained by molding of the negative electrode active material such as carbon particles by using a binder on a surface of a negative electrode current collector 5 comprising, for example, a metal film of copper. The electrolytic layer 3 holds an electrolytic solution containing lithium ion or the like. Furthermore, in a solid electrolyte type lithium battery, a solid polymer having ionic conductivity is used, while in a gel electrolyte type lithium battery, there is used a gel solid polymer having ionic conductivity.

The positive electrode active material layer 6 is obtained by molding the positive electrode active material 8, an electronically conductive material 9 and a conductive agent bonded together by using a binder 11. The electronically conductive material 9 comprises electrically conductive filler and a crystalline resin. Also, the total amount of the electronically conductive material 9 and the conductive agent 10 ranges 1 to 20 parts by weight based on 100 parts by weight of the positive electrode active material.

The positive electrode active material 8 has low electric conductivity. The electronically conductive material 9 and the conductive agent 10 ensure the electronic conduction between the positive electrode active material 8 and the current collector 4. The electronically conductive material 9 having a large particle size forms basic path for conduction of electrons. The conductive agent 10 having a smaller particle size disperses all over the positive electrode active material 8 to collect current from every part of the positive electrode active material 8. The electronically conductive material 9 contains, for example, the electrically conductive filler and the crystalline resin and has a property that the changing ratio of resistance increases in a temperature range of, for example, 90° C. to 160° C. Hereinafter, the property is referred to as PTC (Positive Temperature Coefficient).

As the electrically conductive filler, there can be used a carbon material, an electrically conductive non-oxide or the like. Examples of the carbon material are carbon black, graphite, carbon fiber, metal carbide and the like. And examples of the carbon black are acethylene black, furnace black, lamp black or the like. Examples of the electrically conductive non-oxide are a metal carbide, a metal nitride, a metal silicide, a metal boride and the like. Examples of the metal carbide are TiC, ZrC, VC, NbC, TaC, $Mo_2C$, WC, $B_4C$, $Cr_3C_2$ and the like. Examples of the metal nitride are TiN, ZrN, VN, NbN, TaN, $Cr_2N$ and the like. Examples of the metal boride are $TiB_2$, $ZrB_2$, $NbB_2$, $TaB_2$, CrB, MoB, WB and the like.

Moreover, the crystalline resin mean a polymer such as a high density polyethylene (having a melting point of 130° C. to 140° C.), a low density polyethylene (having a melting point of 110° C. to 112° C.), a polyurethane elastomer (having a melting point of 140° C. to 160° C.) or polyvinyl chloride (having a melting point of about 145° C.), whose melting points are in the range of 90° C. to 160° C.

In the electronically conductive material 9, a temperature of PTC expression depends on the melting point of the crystalline resin contained in the electronically conductive material 9. Thus, the temperature of PTC expression can be controlled in a range of 90° C. to 160° C. by changing a material of the crystalline resin mentioned above.

PTC property may be a reversible property that resistance is returned to the original resistance when the temperature is lowered after expression of the PTC function, or may be an irreversible property.

It is preferable that temperature of PTC expression is at most 90° C. in terms of guarantee of safety. However, resistance at the electrode is increased at a possible temperature range for a battery to be usually kept or used, and thus the battery characteristics such as discharge load characteristics is lowered.

Also, when a temperature of PTC expression is more than 160° C., the inside temperature of the battery is increased to this temperature, which is not preferable from the viewpoint of guarantee of safety. Therefore, in the electronically conductive material 9, it is desirable to set the temperature of PTC expression in a range of 90° C. to 160° C.

Since the temperature of PTC expression depends on the melting point of the crystalline resin, the crystalline resin having melting point of 90° C. to 160° C. is selected.

Also, in a usual condition, i.e. before PTC function is expressed, the resistance of the electrode can be adjusted by changing the ratio of the electronically conductive material 9 and the conductive agent 10 to the total of the positive electrode active material layer 6.

The PTC function is revealed because the resistance of the electronically conductive material 9 itself is increased due to softening, melting and volume expansion of the crystalline resin contained in the electronically conductive material 9.

As to the positive electrode 1 shown in FIG. 1, the electronically conductive material 9 itself contained in the positive electrode active material layer 6 has PTC properties. Thus when a temperature at the electronically conductive material 9 of the positive electrode 1 becomes higher than the temperature of PTC expression, the resistance increases at the positive electrode active material layer 6. The added conductive agent 10 collects current from fine parts, which is difficult for the electronically conductive material alone. According to this, the resistance of the electrode against the conduction of electrons decreases to improve battery properties such as charge-discharge properties.

By containing 0.5 to 30 parts by weight of the conductive agent based on 100 parts by weight of the electronically conductive material 9, a safe battery having a low short-circuit current value and excellent battery properties at the same time can be obtained.

By setting the ratio of the average particle size of the conductive agent to the average particle size of the electronically conductive material 9 to $\frac{1}{1000}$ to $\frac{1}{10}$, a safe battery having a low short-circuit current value and excellent battery properties at the same time can be obtained.

By constructing the active material layer 6 to have two layers, wherein one layer has high content ratio of the electronically conductive material 9 and low content ratio of the conductive agent while the other layer has low content ratio of the electronically conductive material 9 and high content ratio of the conductive agent, a safe battery having a low short-circuit current value and excellent battery properties at the same time can be obtained.

Therefore, in case where an electrode (which is herein applied to a positive electrode) having such properties is applied to a battery, when current is increased due to short-circuit outside or inside the electrode of the battery and a temperature of the electrode or the battery is increased to at least a temperature of some value, resistance of the positive electrode active material layer 6 itself is increased, thereby current flowing inside the battery is controlled.

Accordingly, when the battery is formed by using this electrode, there are effects that safety of the battery is remarkably improved without lacking battery properties and maintained even in an unusual situation such as short-circuit, reversible charge or overcharge.

The positive electrode active material layer 6 was illustrated with an embodiment comprising the positive electrode active material 8, the electronically conductive material 9, the conductive agent 10 and binder 11, but not limited thereto.

Also, the electronically conductive material 9 was illustrated as particles, but the shape may be a fibrous or flaky small piece. Namely, the shape of the electronically conductive material 9 may be any shape having such a size that the electronically conductive material 9 can be disposed among the adjoining positive electrode active material 8 and, at the same time, the conductive agent can be present in the neighbor of the electronically conductive material 9 and the positive electrode active material 8.

In the above explanation, there is disclosed a structure of the positive electrode 1, in particular, that of the positive electrode active material layer 6 comprising the electronically conductive material containing the electrically conductive filler and the crystalline resin, and the conductive agent. However, it is not limited thereto, and a similar effect is also seen even when the above structure is applied to the negative electrode 2 to form a battery.

Hereinafter, there will be explained each example of processes for preparing the positive electrode 1 and the negative electrode 2 and an example of process for preparing the battery using the positive electrode 1 and the negative electrode 2.

(Process for Preparing Positive Electrode)

By finely pulverizing an electronically conductive material having sufficiently low volume specific resistance at a room temperature and high volume specific resistance at a temperature higher than a predetermined temperature of 90° C. to 160° C. (for example, mixture of the electrically conductive filler and the crystalline resin in a predetermined ratio), fine particles of the electronically conductive material is obtained.

As a process for pulverizing the electronically conductive material, it is preferable to use compressed air or a compressed inert gas such as nitrogen or argon. Particularly, in case of downsizing the particle size, the above gas is used to generate an ultrasonic gas flow and the particles of the electronically conductive material are collided with each other or with wall surface (not shown in the figure) in the gas flow to obtain an electronically conductive material having a smaller particle size. Hereinafter, the method for preparing fine particles thereby is referred to as Jet Mill method.

Also, if the particle size of the fine particles of the electronically conductive material need not to be too small, there may be used a process for rotating the electronically conductive material in a ball mill for pulverization instead of using compressed air. This method for preparing fine particles is referred to as Ball Mill method.

Then, the fine particles of the electronically conductive material, the positive electrode active material (such as $LiCoO_2$), the binder (such as PVDF) and the conductive agent (such as acetylene black) were dispersed in a dispersion medium (such as N-methylpyrolidone (hereinafter referred to as "NMP")) to prepare a positive electrode active material paste.

Next, the above the positive electrode active material paste was applied onto the current collector substrate (such as a metal film having a predetermined thickness), which forms the positive electrode current collector 4.

Furthermore, after drying it, pressing was effected at a predetermined temperature with a predetermined surface pressure and the positive electrode active material layer 6 having a desirable thickness was formed to obtain a positive electrode 1.

According to the above-mentioned process for preparing the electrode (the positive electrode 1 in particular), since the pressing is effected at a predetermined temperature with a predetermined surface pressure, adhesion between the electronically conductive material 9 and the active material (herein, positive electrode active material) is improved and resistance of the electrode in a usual condition can be lowered.

That is, by controlling the temperature and the pressure (herein, surface pressure) in pressing the electrode, resistance of the prepared electrode can be adjusted.

Herein, there has been illustrated a case where the positive electrode active material paste is pressed at the predetermined temperature with the predetermined surface pressure. However, the positive electrode 1 may be obtained by heating the positive electrode active material paste at a predetermined temperature (preferably, the melting point or a temperature near the melting point) after pressing the paste at a predetermined surface pressure.

Hereinafter, a process for preparing the negative electrode 2 is explained.

(Process for Preparing Negative Electrode)

A paste for negative electrode active material paste prepared by dispersing mesophase carbon microbeads (hereinafter referred to as MCMB) and PVDF in NMP was applied onto a current collector substrate (such as a metal film having a predetermined thickness) which forms negative electrode current collector to form the negative electrode active material layer 7 and obtain the negative electrode 2.

Hereinafter, a process for preparing the battery is explained.

(Process for Preparing Battery)

By interposing a porous polypropylene sheet between the positive electrode and the negative electrode obtained by the above method and laminating the both electrode, a battery having one pair of the positive electrode and the negative electrode can be obtained.

In the battery obtained according to the above method, safety of the battery itself is improved, since the resistance of the positive electrode is increased when the temperature is increased, and thus increase of short-circuit current can be controlled even when short-circuit happens outside or inside the battery and a temperature of the battery is increased. Also, battery properties can be improved by setting the total amount of the electronically conductive material and the conductive agent to a predetermined range.

Hereinafter, more concrete examples of the present invention are illustrated. However, the present invention is not intended to be limited to these examples.

EXAMPLE 1

(Process for Preparing Positive Electrode)

Pulverized in fine particles is an electronically conductive material (for example a mixture obtained by mixing in the ratio of 60 parts by weight of carbon black and 40 parts by weight of polyethylene) having volume specific resistance of 0.2 ($\Omega \cdot cm$) at a room temperature and volume specific resistance of 20 ($\Omega \cdot cm$) at a temperature of 135° C. according to Jet Mill method.

Then, 12 parts by weight of the pulverized particles, 83.5 parts by weight of a positive electrode active material comprising $LiCoO_2$, 0.5 part by weight of a conductive agent comprising acetylene black and 4 parts by weight of a binder comprising PVDF are dispersed in NMP as a dispersion medium to obtain a positive electrode active material paste.

Then, the above positive electrode active material paste was applied onto a metal film (herein an aluminum foil) having a thickness of 20 ($\mu m$) which forms the positive electrode current collector 4 according to Doctor Blade method. Furthermore, it was dried at a temperature of 80° C., and was pressed at a room temperature with a surface pressure of 2 ton/cm² to form a positive electrode active material layer 6 having a thickness of approximately 100 $\mu m$ to obtain the positive electrode 1.

(Process for Preparing Negative Electrode)

A negative electrode active material paste was prepared by dispersing 90 parts by weight of MCMB and 10 parts by weight of PVDF in NMP. The paste was applied onto a negative electrode current collector comprising a copper foil having a thickness of 20 $\mu m$ according to Doctor Blade method to form the negative electrode active material layer 7 and to prepare the negative electrode 2.

(Process for Preparing Battery)

A porous polypropylene sheet (available from Höchst Co., Ltd.; Trade-name: CELLGUARD #2400) was interposed between the positive electrode and the negative electrode prepared by the above process to laminate the both electrodes and a battery having one pair of the positive electrode and the negative electrode was obtained.

(Evaluation of Electrodes and Battery)

In order to evaluate electrodes and a battery of the present invention, the following manners were employed.

(Capacitance Test)

The prepared positive electrode was cut into a part having size of 65 mm×38 mm, and the prepared negative electrode was cut into a part having size of 71 mm×44 mm. A porous polypropylene sheet (available from Höchst Co., Ltd.; Trade-name: CELLGUARD #2400), which is used as separator 3, was interposed between the positive and negative electrodes and both electrodes were laminated to prepare a unit cell. The current collector terminals were mounted to each of the positive and negative electrodes of the unit cell by spot welding. The unit cell was placed into a bag made of an aluminum-laminated sheet. An electrolytic solution obtained by dissolving lithium hexafluorophosphate in a mixed solvent of ethylene carbonate and diethyl carbonate (in a molar ratio of 1:1) in a concentration of 1.0 mol/dm³ was put thereinto, and the bag was sealed to prepare a battery by thermal fusing. A charge-discharge test of this battery was carried out at a room temperature.

(Short-circuit Test)

The battery prepared in the same manner as in the capacitance test was charged at a room temperature to 4.1 volts in 8.0 mA. After completion of charging, a temperature of the battery was gradually elevated from a room temperature. And the positive and negative electrodes were short-circuited at a pre-determined temperature, and then the current value at the point was measured.

COMPARATIVE EXAMPLE 1

For comparison, a battery was prepared by adding the electronically conductive material alone without any conductive agent.

In this Comparative Example, the process for preparing the positive electrode, the negative electrode and the battery and the evaluation manners for the battery ware the same as shown in Example 1 except that no conductive agent was added.

Comparative Example 2

For comparison, a battery was prepared by adding the conductive agent alone without any electronically conductive material in the process for preparing the positive electrode of Example 1.

In Comparative Example 2, the process for preparing the positive electrode, the negative electrode and the battery and the evaluation manners for the battery were the same as shown in Example 1 except that the electrode contained no electronically conductive material.

Figure 2:
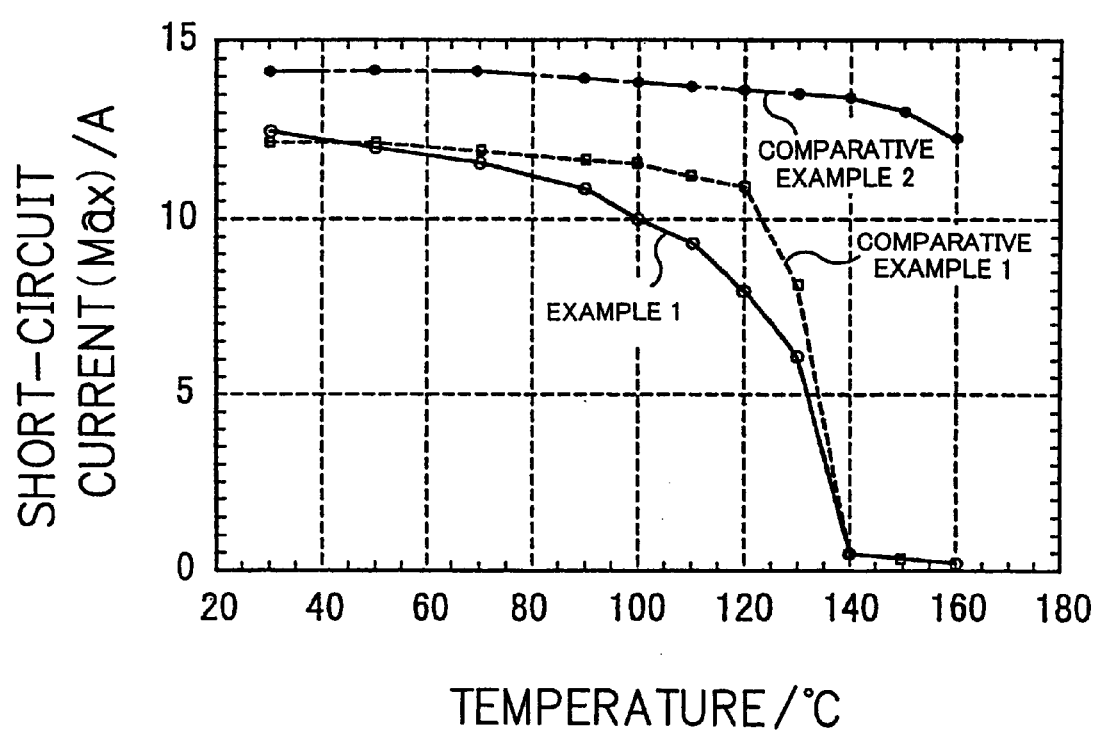
FIG. 2 shows the maximum short-circuit current in short-circuit current test at each temperature in Example 1.
Figure 3:
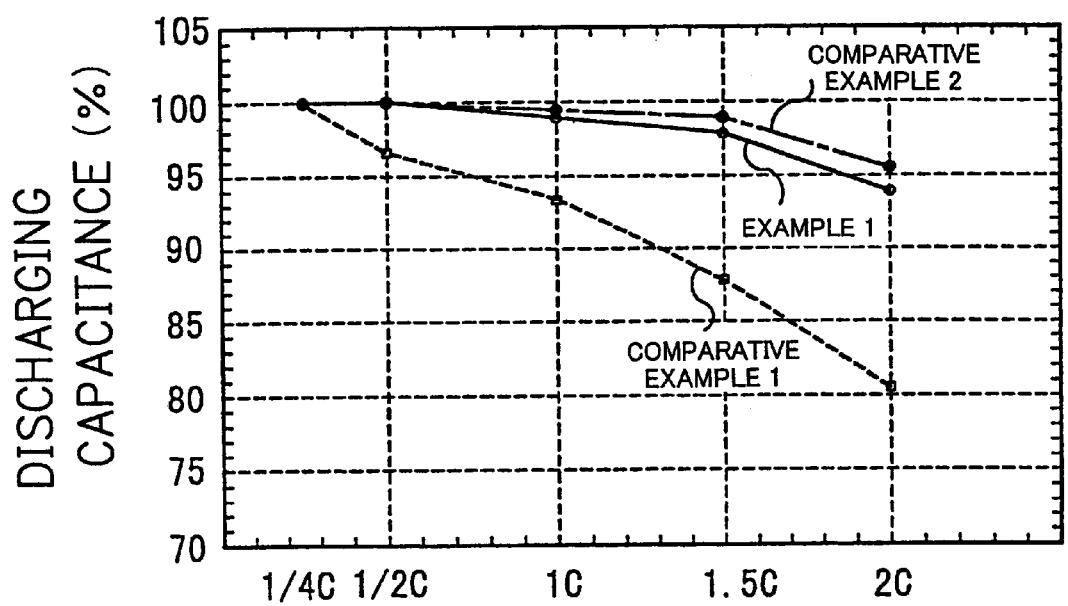
FIG. 3 shows discharge capacitance of the battery against the discharge current in Example 1.

FIG. 2 shows the maximum short-circuit current at each temperature of the batteries of Example 1, Comparative Example 1 and Comparative Example 1 in short-circuit test. FIG. 3 shows discharging capacitance against the discharge current of the batteries of Example 1, Comparative Example 1 and Comparative Example 1. Herein, each discharge capacitance means the discharge capacitance in each discharge current based on the discharge capacitance at ($1/4$)C (C: time rate) as 100%.

As shown in FIG. 3, the electronic resistance of the battery is high and the discharge capacitance is low when discharge current is high as at 2C in Comparative Example 1 since the no conductive agent is contained except for the electronically conductive material. Also, as shown in FIG. 2, since electrode does not contain the electronically conductive material having the property that resistance is increased in accordance with temperature rise, resistance of the electrode does not increase and also the short-circuit current of the battery hardly decreases in accordance with temperature rise. On the other hand, since the active material, the electronically conductive material, the conductive agent and the binder are mixed in the pre-determined ratio inside the electrode of Example 1, the PTC function was revealed when temperature inside the battery gets higher than the predetermined temperature and controls the increase of short-circuit before the temperature of the battery exceeds 160° C. if the electrode was used for the battery. Therefore, safety and reliability of the battery are further improved. Also, current collection from fine part becomes possible due to function of the conductive agent in addition to the electronically conductive material, leading to decrease of resistance at the electrode and improvement of battery properties.

Herein, acetylene black (Denka black available from DENKI KAGAKU KOGYO K.K.) was used as the conductive agent, but the agent is not limited thereto. The conductive agent may be any material having no PTC function but having a function of improving electric conductivity of the positive electrode active material layer, for example, carbon black such as ketjen black or lump black or graphite carbon such as KS6 or MCMB.

In this way, the electrode contains the pre-determined amount of the both of the electronically conductive material having a property that resistance is increased in accordance with temperature rise, and the conductive agent, and there can be obtained a battery having low short-circuit current at a high temperature with excellent battery properties such as discharging capacitance and cycle life.

Comparative Example 3

For comparison, an electrode was prepared as in Example 1 by using a mixed material of carbon black and polypropylene (having a melting point of 168° C.) as the electronically conductive material 9 to constitute a battery.

In Comparative Example 3, the processes for preparing the negative electrode and the battery are the same as those in Example 1.

Figure 4:
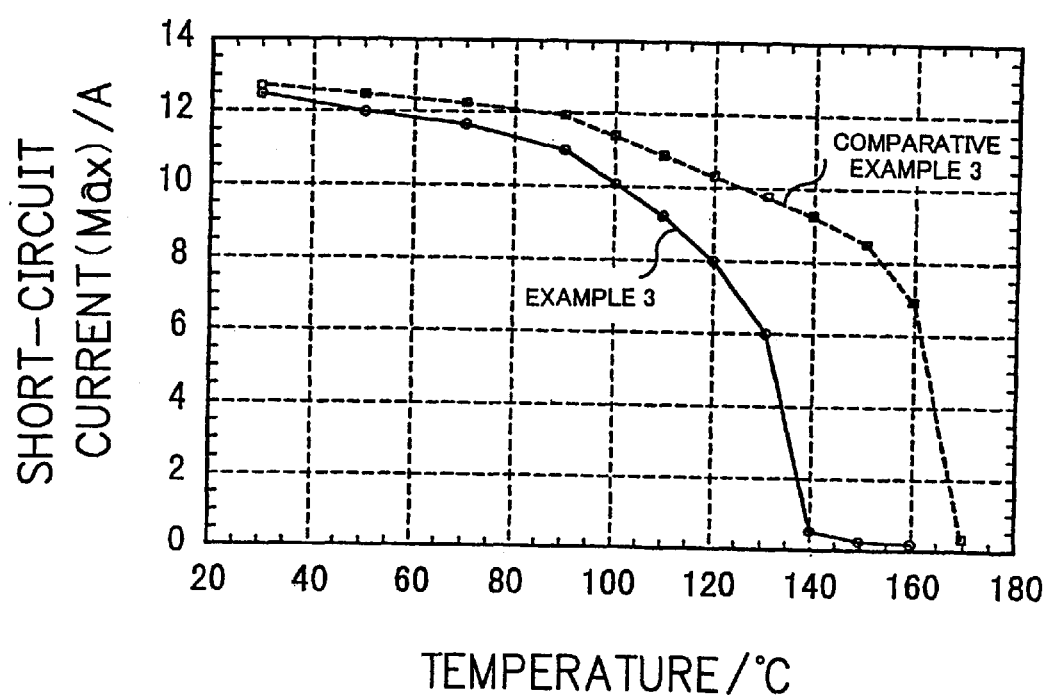
FIG. 4 shows the maximum short-circuit current in short-circuit current test at each temperature in Example 1.

FIG. 4 shows the relationship between temperature and the maximum current in short-circuit test for the batteries in Example 1 and Comparative Example 3.

As shown in the figure, since the polypropylene resin having a melting point of 168° C. was used as the crystalline resin in Comparative Example 3, it is thought that the temperature of PTC expression exceeds 160° C. when the electrode containing this crystalline resin is applied to a battery.

On the other hand, in Example 1, polyethylene having a melting point lower than 160° C. was used as the crystalline resin, and thus increase of short-circuit current was controlled before the temperature exceeded 160° C. to further improve safety and reliability of the battery.

Thus, if the crystalline resin having a melting point of 90° C. to 160° C. is selected as the crystalline resin contained in the electronically conductive material 9, it is possible to prevent decrease of battery properties and set the PTC expression temperature lower than 160° C.

Comparative Example 4

For comparison, a positive electrode was prepared as in Example 1 by using a material obtained by mixing 38 parts by weight of carbon black and 62 parts by weight of polyethylene as the electronically conductive material to constitute a battery. In Comparative Example 4, the processes for preparing the negative electrode and the battery are the same as those in Example 1.

Comparative Example 5

For comparison, a positive electrode was prepared by using a material obtained by mixing 71 parts by weight of carbon black and 29 parts by weight of polyethylene as the electronically conductive material to constitute a battery.

In Comparative Example 5, the processes for preparing the negative electrode and the battery are the same as those in Example 1.

Table 1 shows discharging capacitance of each of the batteries at 2C (C: time rate) and the maximum short-circuit current at 140° C.

TABLE 1

|  | Discharging Capacitance at 2C (%) | Maximum Short-circuit Current at 140° C. (A) |
| --- | --- | --- |
| Ex. 1 | 92 | 0.54 |
| Com. Ex. 4 | 57 | 0.52 |
| Com. Ex. 5 | 95 | 6.2 |

As shown in Table 1, electronic resistance of the electrode became larger and discharging capacitance became lower in Comparative Example 4 in comparison with Example 1.

Furthermore, in Comparative Example 5, discharging capacitance was higher than that of Example 1. But decrease of short-circuit current was hardly found in a short-circuit test, because the PTC function is insufficient due to a high ratio of carbon black.

Therefore, by changing the ratio of the electrically conductive filler contained in the electronically conductive material, the maximum short-circuit current in the short-circuit test and discharging capacitance of the battery can be adjusted to suitable values.

In particular, by setting an amount of the electrically conductive filler contained in the electronically conductive material to 40 to 70 parts by weight, the maximum short-circuit current can be lowered in the short-circuit test while discharging capacitance of the battery can be improved.

Moreover, by setting an amount of the electrically conductive filler contained in the electronically conductive material to 50 to 68 parts by weight, the battery properties shown in Table 1 can be more preferable.

EXAMPLE 2

In Example 2, the content ratio of the total amount of the electronically conductive material and the conductive agent in Example 1 was varied while others were the same as in Example 1.

Figure 5:
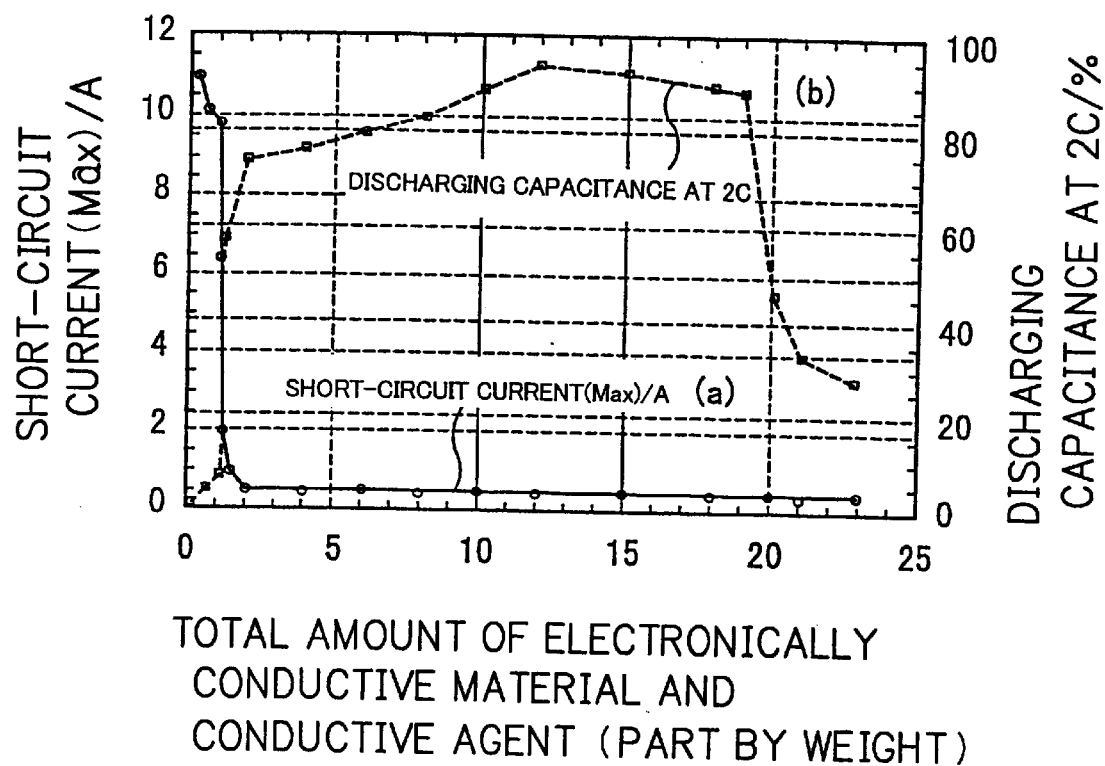
FIG. 5 shows the maximum short-circuit current and discharge capacitance against the total amount of the electronically conductive material and the conductive agent in Example 2.

FIG. 5 shows relationship of the maximum short-circuit current in short-circuit test to the ratio of the electronically conductive material and the conductive agent, and the relationship of discharging capacitance to the ratio of the electronically conductive material. Specifically, FIG. 5 illustrates the relationship of the maximum short-circuit current to the ratio of the electronically conductive material and the conductive agent (parts by weight) based on 100 parts by weight of the positive electrode active material ((a) in the figure), and the relationship of discharging capacitance to the ratio of the electronically conductive material and the conductive agent (parts by weight) based on 100 parts by weight of the positive electrode active material ((b) in the figure). Herein, the amount of the electronically conductive material was varied while that of the conductive agent is maintained to 0.5 part by weight.

As shown in the figure, when the electronically conductive material and the conductive agent is at most 1 part by weight, usual resistance of the electrode becomes excessively high, discharging capacitance becomes small and thus, there are problems in battery properties. Also, when the electronically conductive material and the conductive agent is at most 1 part by weight, the PTC function decreases. On the other hand, when at least 20 parts by weight thereof is used, the amount of the active material is decreased to lower discharging capacitance.

Therefore, by setting the ratio of the electronically conductive material and the conductive agent contained in the electrode to 1 to 20 parts by weight, usual resistance of the electrode can be lowered and discharging capacitance of the battery using this electrode can be increased to obtain a battery having more preferable properties.

More preferably, by setting the ratio of the electronically conductive material and the conductive agent based on 100 parts by weight of the active material in the electrode (herein, the positive electrode) to 1.5 to 18 parts by weight, most preferably, 2 to 15 parts by weight, the above properties can be more preferable.

EXAMPLE 3

In Example 3, the content ratio of the conductive agent against the electronically conductive material in Example 1 was varied while others were the same as in Example 1.

Figure 6:
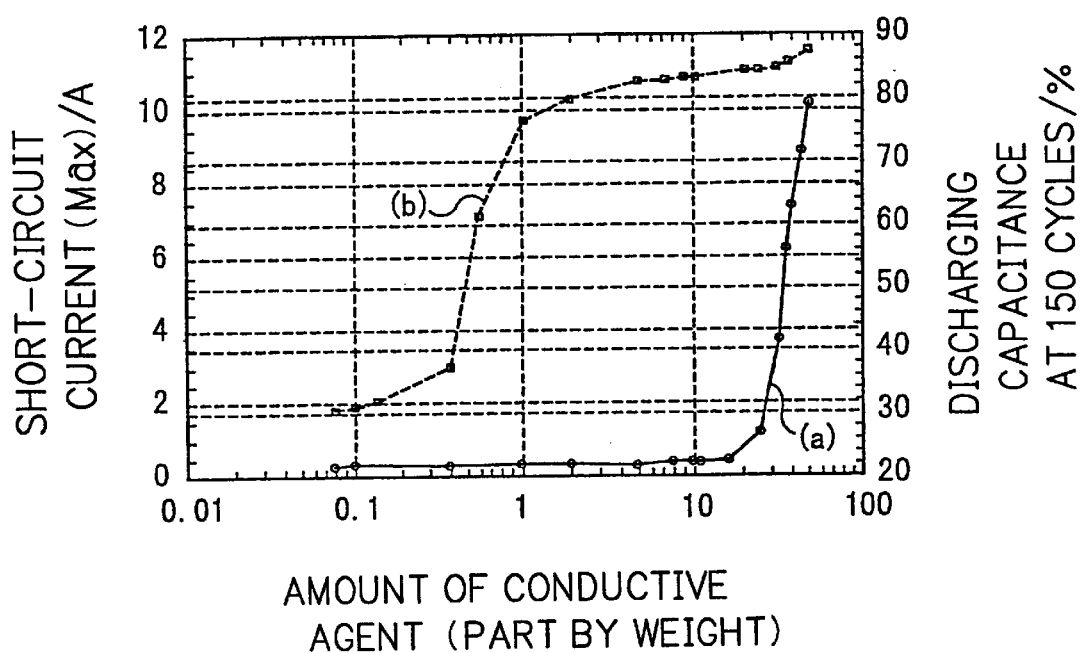
FIG. 6 shows the maximum short-circuit current and discharging capacitance at 150 cycle against the ratio of conductive agent in Example 3.

FIG. 6 shows the relationship of the ratio of the conductive agent (parts by weight) based on 100 parts by weight of the electronically conductive material to the maximum short-circuit current in short-circuit test at 140° C. ((a) in the figure) and discharging capacitance at 150 cycle ((b) in the figure). The discharging capacitance at 150 cycle was shown as a discharging capacitance value relatively based on the discharge capacitance at first cycle as 100%.

As shown in the figure, when the amount of the conductive agent is at most 0.5 part by weight based on 100 parts by weight of the electronically conductive material, electronic resistance of the battery becomes excessively high while discharging capacitance becomes low. Also, when the amount of the conductive agent is at least 30 parts by weight, the volume of the conductive agent in the active material becomes large. Then, the PTC function of the electronically conductive material decreases since current collection occurs only by conduction among the conductive agent even if the PTC function of the electronically conductive material comes into effect at short-circuit.

Therefore, if the ratio of the conductive agent is set to 0.5 to 30 parts based on 100 parts by weight of the electronically conductive material, discharging capacitance of the battery can be increased and short-circuit current can be lowered to obtain a battery having more preferable properties.

EXAMPLE 4

In Example 4, the average particle size of the conductive agent was varied based on the particle size of the electronically conductive material in Example 1 while others were the same as in Example 1.

Figure 7:
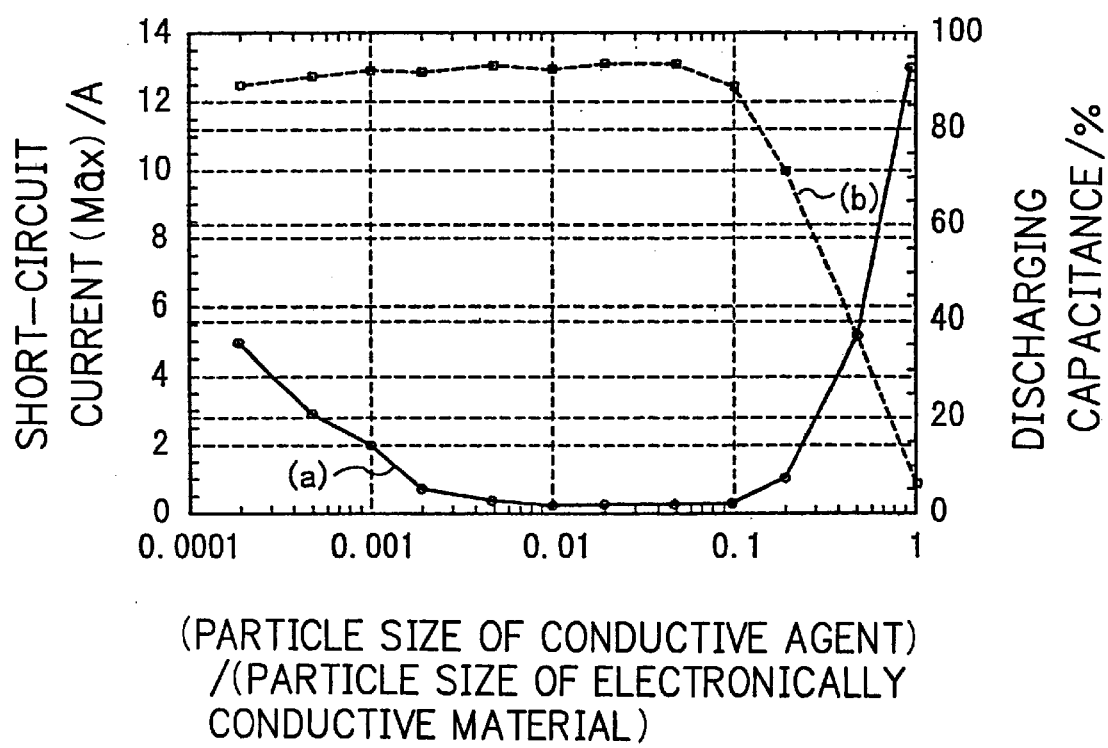
FIG. 7 shows the maximum short-circuit current and discharging capacitance against (average particle size of electronically conductive material)/(average particle size of conductive agent) in Example 4.

FIG. 7 shows the maximum short-circuit current ((a) in the figure) and discharging capacitance ((b) in the figure) against (average particle size of conductive agent)/(average particle size of electronically conductive material) in short-circuit test at 140° C. When the particle size of the conductive agent is at least 1/10 of the particle size of the electronically conductive material, the effect of current collection at fine part inside the active material layer decreases.

Fundamentally, the electronically conductive material forms the path for current collection in the electrode of the present invention. The electronically conductive material alone does not collect current from fine part sufficiently. But by adding the conductive agent having finer particle size, the conductive agent contained in the space among the active material and the electronically conductive material helps to couple the active material with the electronically conductive material to achieve the current collection from fine part. However, if the particle size of the conductive agent becomes too larger to be contained among the active material and the electronically conductive material, not only the efficiency of current collection at fine part decreases but also current collection path through the conductive agent may be formed apart from the current collection path through the electronically conductive material. In this case, current flows through the path formed by the conductive agent even if the current collection path through the electronically conductive material is broken due to increase of resistance at the electronically conductive material in temperature rise. Therefore, large short-circuit current flows. As a result, the maximum short-circuit current increases if (average particle size of conductive agent)/(average particle size of electronically conductive material) become at least 1/10 as shown in FIG. 7.

Also, if the particle size of the conductive agent becomes at most 1/1000 to the particle size of the electronically conductive agent, the conductive agent becomes enormous in particle number, and not only filled in the space between the active material and the electronically conductive agent, but also overflow out of the space. In this case, the overflowed particles of the conductive agent alone form narrow path for current collection to increase short-circuit current. Therefore, short-circuit current tends to increase if the value of (average particle size of conductive agent)/(average particle size of electronically conductive material) is too large or too small.

If the particle size of the conductive agent is too small, moldability of the electrode is lowered and also, the mechanical strength is weakened. Accordingly, by setting the average particle size of the conductive agent to $1/1000$ to $1/10$ based on the average particle size of the electronically conductive material, it is possible to prepare a battery having more preferable battery properties such as low short-circuit current and high discharge capacitance.

EXAMPLE 5

Figure 8:
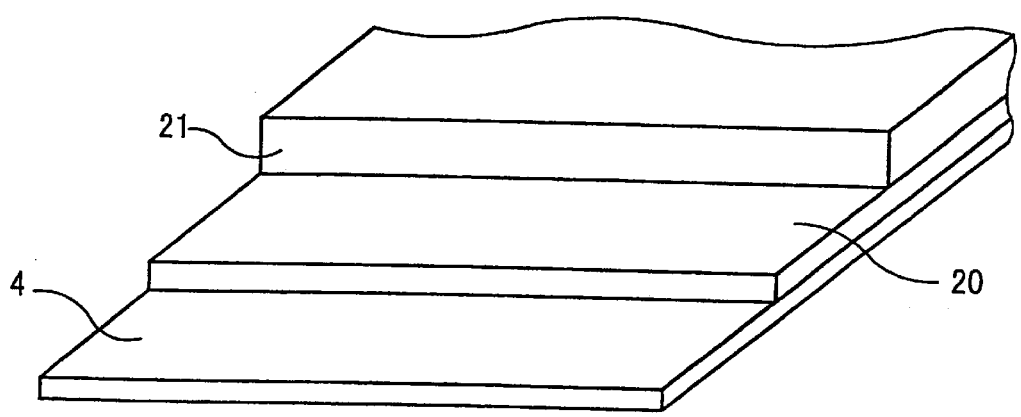
FIG. 8 is a perspective view illustrating the structure of the electrode of Example 5.

In Example 5, an active material layer comprises a layer 20 having much electronically conductive material (comprising, for example, active material: electronically conductive material: conductive agent: binder=67:25:1:7) which directly contacts aluminum foil 4 which forms the positive electrode current collector, and a layer 21 thereon having a small ratio of the electronically conductive material and a high ratio of the conductive agent (in a ratio of, for example, active material: electronically conductive material: conductive agent: binder=91:0.5:4.5:4) on the current collector 4 as shown in FIG. 8.

In Example 5, the processes for preparing the negative electrode and the battery are the same as those in Example 1.

Figure 9:
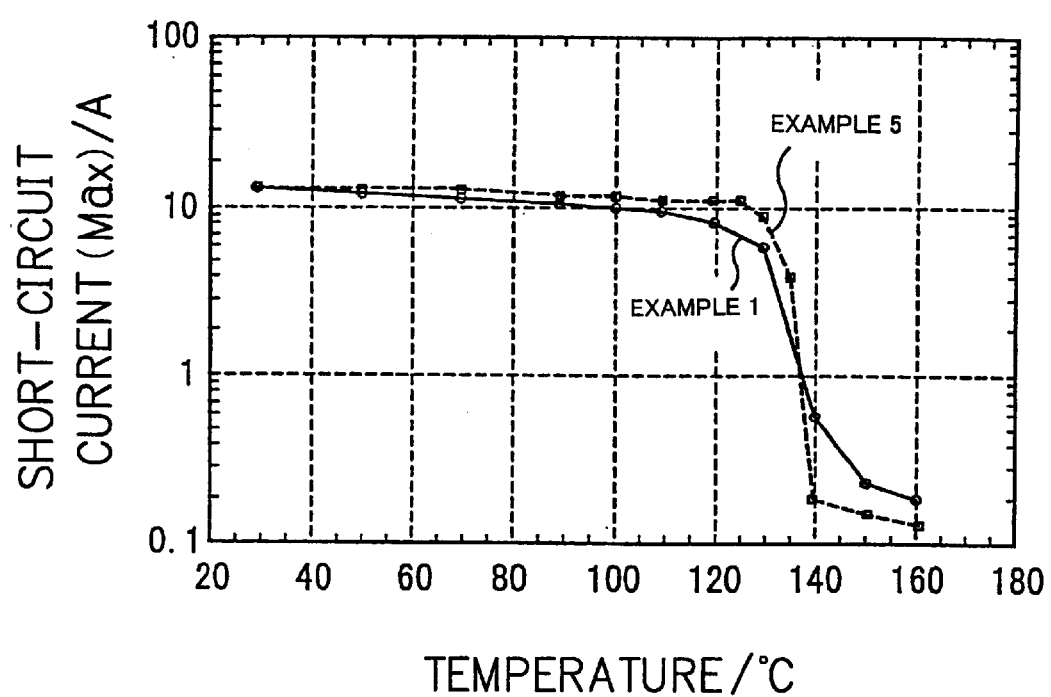
FIG. 9 shows the maximum short-circuit current in short-circuit current test at each temperature in Examples 1 and 5.
Figure 10:
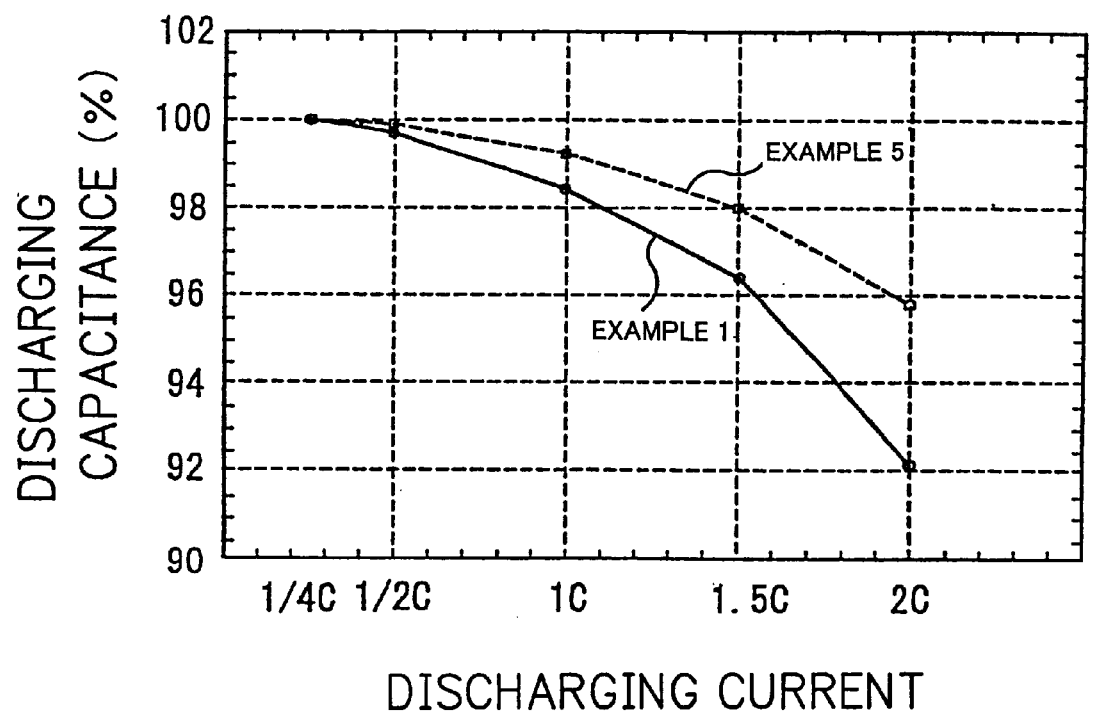
FIG. 10 shows discharging capacitance against discharge current in Examples 1 and 5.

FIG. 9 shows the maximum short-circuit current of the battery in short-circuit tests of Examples 1 and 5. FIG. 10 is the discharging capacitance of the batteries of Examples 1 and 5.

As shown in the figures, due to an effect of using the layer 20 having a large amount of electronically conductive material, current is efficiently broken in short-circuit test in Example 5, and the maximum short-circuit current is extremely low. Also, since there is the layer 21 which contains a small amount of the electronically conductive material and a large amount of the conductive agent, discharging capacitance is high and cycle life is excellent. Employing these two layers together to make a battery to have low short-circuit current and excellent battery properties.

Additionally, the electrode and the battery shown in the above Examples 1 to 5 can be used for a lithium ion secondary battery of an organic electrolytic solution type, a solid electrolytic type, and a gel electrolytic type, a primary battery such as a lithium/manganese dioxide battery, or another secondary battery.

Furthermore, the above electrode and the battery are useful for aqueous-solution primary and secondary batteries. These electrode and battery can be further used for primary and secondary batteries of laminated type, winding type, button type and the like regardless of the battery shape.

Figure 11:
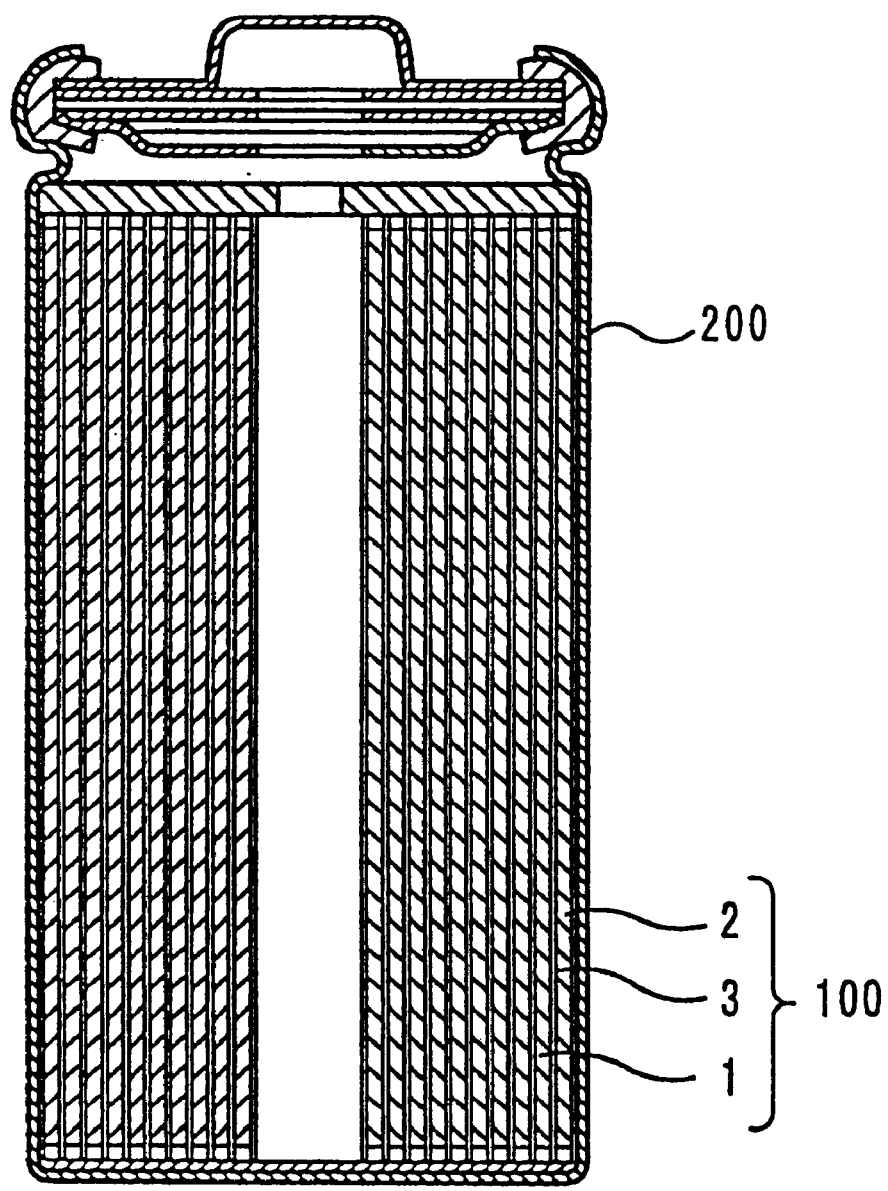
FIG. 11 is a cross sectional view illustrating one embodiment of a cylindrical battery.

FIG. 11 is a typical cross sectional view illustrating a structure of a cylindrical lithium ion secondary battery. In the figure, numeral 200 indicates an outer can made of stainless or the like, which also functions as a negative terminal. Numeral 100 indicates a battery body contained inside the outer can 1. The battery body 2 has such a structure that a positive electrode 1, a separator 3 and a negative electrode 2 are wound in a spiral shape.

The positive electrode 1 of the battery body 100 has the structure of any electrode described in Examples 1 to 5.

Also, the structure may be such that the negative electrode 2 has the negative electrode active material layer containing the electronically conductive material containing the crystalline resin and the electrically conductive filler, and the conductive agent.

INDUSTRIAL APPLICABILITY

The electrode and battery of the present invention can be applied to a lithium ion secondary battery of an organic electrolytic solution type, a solid electrolyte type and a gel electrolyte type, a primary battery such as a lithium/manganese dioxide battery, or another secondary battery.

Furthermore, these can be applied also to an aqueous-solution primary and secondary battery and a primary and secondary battery of a laminated type, a winding type, a button type or the like regardless of the battery shape.

What is claimed is:

1. A battery, comprising an electrode containing
   an active material;
   an electronically conductive material contacted to the active material; and
   a conductive agent contacted to the active material, wherein
   the electronically conductive material contains
   an electrically conductive filler and
   a crystalline resin; and
   the average particle size of the conductive agent is $1/1000$ to $1/10$ based on the average particle size of the electronically conductive material.

2. The battery according to claim 1, wherein 0.5 to 30 parts by weight of the conductive agent is contained based on 100 parts by weight of the electronically conductive material.

3. The battery according to claim 1, wherein the total amount of the electronically conductive material and the conductive agent is 1 to 20 parts by weight based on 100 parts by weight of the active material.

4. The battery according to claim 1, wherein a melting point of the crystalline resin in the electronically conductive material is in a range of 90° C. to 160° C.

5. The battery according to claim 1, wherein an amount of the electrically conductive filler is 40 to 70 parts by weight in the electronically conductive material.

6. The battery according to claim 1, wherein a carbon material or an electrically conductive non-oxide is used as the electrically conductive filler.

7. A battery, comprising an electrode having
   an active material layer containing an active material;
   an electronically conductive material contacted to the active material; and
   a conductive agent contacted to the active material, wherein
   the electronically conductive material contains
   an electrically conductive filler and
   a crystalline resin; and
   the active material layer comprises two layers, one of which comprises a greater ratio of the electronically conductive material therein as compared to the other.

8. The battery according to claim 7, wherein a melting point of the crystalline resin in the electronically conductive material is in a range of 90° C. to 160° C.

9. The battery according to claim 7, wherein an amount of the electrically conductive filler is 40 to 70 parts by weight in the electronically conductive material.

10. The battery according to claim 7, wherein a carbon material or an electrically conductive non-oxide is used as the electrically conductive filler.

11. The battery according to claim 1, wherein said electrically conductive filler is a carbon material.

12. The battery according to claim 1, wherein said carbon material comprises carbon black, graphite, carbon fiber or metal carbide.

13. The battery according to claim 1, wherein said electrically conductive filler is a metal carbide, metal nitride, metal boride or metal silicide.

14. The battery according to claim 1, wherein said crystalline resin is a high density polyethylene having a melting point of 130 to 140° C.

15. The battery according to claim 1, wherein said crystalline resin is a low density polyethylene having a melting point of 110 to 112° C.

16. The battery according to claim 1, wherein said crystalline resin is a polyurethane elastomer having a melting point of 140 to 160° C.

17. The battery according to claim 1, wherein said crystalline resin is a polyvinyl chloride having a melting point of about 145° C.

18. The battery according to claim 1, which is a lithium ion secondary battery which comprises an organic electrolytic solution.

19. The battery according to claim 1, which is a lithium ion secondary battery which comprises a solid electrolyte.

20. The battery according to claim 1, which is a lithium ion secondary battery which comprises a gel electrolyte.

21. The battery according to claim 1, which is a lithium/manganese dioxide battery.

22. A method of making a battery, the method comprising laminating an electrode and an electrolytic layer; and producing the battery of claim 1.

23. A method of making a battery, the method comprising laminating an electrode and an electrolytic layer; and producing the battery of claim 7.

* * * * *